(12) United States Patent
Yan

(10) Patent No.: US 11,981,509 B2
(45) Date of Patent: May 14, 2024

(54) WAREHOUSING CONTROL SYSTEM AND COMPUTER DEVICE

(71) Applicant: Beijing Tusen Zhitu Technology Co., Ltd., Beijing (CN)

(72) Inventor: Chao Yan, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 207 days.

(21) Appl. No.: 17/660,538

(22) Filed: Apr. 25, 2022

(65) Prior Publication Data

US 2022/0250843 A1 Aug. 11, 2022

Related U.S. Application Data

(63) Continuation of application No. 16/677,386, filed on Nov. 7, 2019, now Pat. No. 11,312,572.

(30) Foreign Application Priority Data

Nov. 7, 2018 (CN) .......................... 201811320088.X

(51) Int. Cl.
*G06F 7/00* (2006.01)
*B65G 1/137* (2006.01)
*G05B 19/418* (2006.01)

(52) U.S. Cl.
CPC ..... *B65G 1/1373* (2013.01); *G05B 19/41865* (2013.01); *G05B 2219/32252* (2013.01)

(58) Field of Classification Search
CPC ................ B65G 1/1373; B65G 63/004; G05B 19/41865; G05B 2219/32252; G06Q 10/063; G06Q 10/087; G06Q 50/28

(Continued)

(56) References Cited

U.S. PATENT DOCUMENTS

| 4,973,219 A | 11/1990 | Brickner |
| 6,577,921 B1 | 6/2003 | Carson |

(Continued)

FOREIGN PATENT DOCUMENTS

| CN | 206249392 U | 6/2017 |
| CN | 107146055 A | 9/2017 |

(Continued)

OTHER PUBLICATIONS

Chinese Patent Office, 1st Office Action for Appl. No. 201910058408.7, dated Jul. 31, 2023, 22 pages with English translation.

(Continued)

*Primary Examiner* — Yolanda R Cumbess
(74) *Attorney, Agent, or Firm* — Perkins Coie LLP

(57) ABSTRACT

The present disclosure provides a warehousing control system and a computer device. The warehousing control system includes: a communication module configured to transmit and receive information; and a warehousing server configured to: plan, upon receiving a container warehousing task via the communication module, a target warehousing area and a target warehousing space corresponding to each container in the container warehousing task, and assign a warehouse hoisting apparatus to hoist a target container carried by a transportation vehicle to a corresponding target warehousing space; and/or assign, upon receiving a container distribution task via the communication module, a warehouse hoisting apparatus to load a target container in the container distribution task onto an assigned transportation vehicle. In this way, intelligent unmanned warehousing can be achieved, such that the operation efficiency of warehousing can be improved and the cost of warehousing management can be reduced.

20 Claims, 2 Drawing Sheets

(58) Field of Classification Search
USPC .................................. 700/213–216, 218, 228
See application file for complete search history.

(56) References Cited

U.S. PATENT DOCUMENTS

| | | | |
|---|---|---|---|
| 6,931,314 | B2 | 8/2005 | Holland |
| 10,029,865 | B1 | 7/2018 | McCalib, Jr. |
| 10,518,972 | B2 | 12/2019 | Alba |
| 2010/0021272 | A1* | 1/2010 | Ward .................... B65G 57/20 |
| | | | 700/214 |
| 2011/0027059 | A1* | 2/2011 | Benedict ............... B66C 19/002 |
| | | | 414/803 |
| 2017/0031356 | A1 | 2/2017 | Bell |
| 2017/0129503 | A1 | 5/2017 | Meissner |
| 2017/0322561 | A1* | 11/2017 | Stiernagle .......... G06Q 10/0875 |
| 2020/0104790 | A1* | 4/2020 | Chung ................. H04W 4/029 |

FOREIGN PATENT DOCUMENTS

| | | |
|---|---|---|
| CN | 108427423 A | 8/2018 |
| CN | 208061027 U | 11/2018 |

OTHER PUBLICATIONS

Second Chinese Office Action received Nov. 30, 2023 for Application No. 201910058408.7, 22 pages.
Chinese Patent Office, Notice of Grant for Application No. 201910058408.7 dated Dec. 22, 2023, 10 pages.

\* cited by examiner

WAREHOUSING CONTROL SYSTEM AND COMPUTER DEVICE

CROSS-REFERENCE TO RELATED APPLICATION(S)

This patent document is a continuation of U.S. application Ser. No. 16/677,386 filed Nov. 7, 2019, entitled "WAREHOUSING CONTROL SYSTEM AND COMPUTER DEVICE" and which claims the benefit of priority of Chinese Patent Application No. 201811320088.X, filed Nov. 7, 2018. The entire content of the before-mentioned patent applications is incorporated by reference as part of the disclosure of this application.

TECHNICAL FIELD

The present disclosure relates to artificial intelligence technology, and more particularly, to a warehousing control system and a computer device.

BACKGROUND

As a hub station for waterway-land coordinated transportation, a port is a buffer for conversion of transportation schemes of containerized goods, and plays an important role in the whole container transportation process. At the port, container transportation operations such as container unloading and container loading are required for inbound and outbound containers.

The process of container unloading is generally as follows. After a ship arrives at a port, a container is first moved onto a transportation vehicle by a shore crane (or shore bridge). Then, the container is transported by the transportation vehicle to a yard (or warehouse center). Finally, the container on the transportation vehicle is placed at a corresponding location in the yard by a warehouse hoisting apparatus (such as a rail-mounted gantry crane, a rubber-tired gantry crane, a forklift, etc.) near the yard, thereby completing the ship unloading operation.

The process of container loading is generally as follows. A container in a yard is lifted and placed onto a transportation vehicle by a warehouse hoisting apparatus at the yard, and transported by the transportation vehicle to a shore crane where a ship is located. The container on the transportation vehicle is placed onto the ship by the shore crane, thereby completing the ship loading operation.

SUMMARY

In a first aspect, according to an embodiment of the present disclosure, a warehousing control system is provided. The warehousing control system includes: a communication module configured to transmit and receive information; and a warehousing server. The warehousing server includes at least one processor and at least one memory. The at least one memory stores at least one machine executable instruction which, when executed by the at least one processor, causes the at least one processor to: plan, upon receiving a container warehousing task via the communication module, a target warehousing area and a target warehousing space corresponding to each container in the container warehousing task, and assign a warehouse hoisting apparatus to hoist a target container carried by a transportation vehicle to a corresponding target warehousing space; and/or assign, upon receiving a container distribution task via the communication module, a warehouse hoisting apparatus to load a target container in the container distribution task onto an assigned transportation vehicle.

In a second aspect, according to an embodiment of the present disclosure, a computer device is provided. The computer device includes the warehousing control system according to the above first aspect.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in further detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION

In the following, exemplary embodiments of the present disclosure will be described in further detail with reference to the figures. While the exemplary embodiments of the present disclosure are shown in the figures, it is to be noted that the present disclosure can be implemented in various forms and are not limited to the embodiments described below. Rather, these embodiments are provided to facilitate a more thorough understanding of the present disclosure and to convey the scope of the present disclosure fully to those skilled in the art.

Conventionally at a port, the above container transportation operations such as loading and unloading require human intervention. For example, ships need to be steered and controlled by humans to berth at specified locations. Hoisting apparatus and transportation vehicles need to be driven and operated by operators to perform operations such as container loading, container unloading and transportation. Yards or warehouse centers also need human intervention to arrange locations at which containers are to be placed. Thus, the conventional container transportation operations at the port have low level of intelligence and require a large amount of human resources, resulting in a low operation efficiency. Further, due to the complicated environment in the field, it is difficult to guarantee the safety of the operators. Moreover, the labor cost is relatively high as a large number of operators are required.

The technical solutions according to the embodiments of the present disclosure can allow communications and interactions among a warehousing control system, a scheduling center, a warehouse hoisting apparatus, and a transportation vehicle, so as to achieve intelligent control of warehousing and scheduling. The warehousing and distribution of containers can be achieved without human intervention, such that fully automated intelligent warehousing can be achieved, thereby reducing human resource consumption, reducing human resource investment, improving operation efficiency, and avoiding the problem associated with lack of safety guarantee for operators.

Detailed description will be given below with reference to the embodiments.

Figure 1:
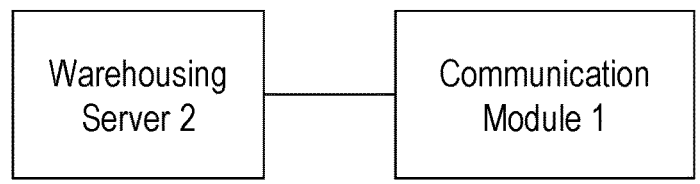
FIG. 1 is a first schematic diagram showing a structure of a warehousing control system according to an embodiment of the present disclosure.

FIG. 1 is a schematic diagram showing a structure of a warehousing control system according to an embodiment of the present disclosure. Referring to FIG. 1, the warehousing control system includes a communication module 1 and a warehousing server 2.

The communication module 1 is configured to transmit and receive information.

The warehousing server 2 includes at least one processor and at least one memory. The at least one memory stores at least one machine executable instruction which, when executed by the at least one processor, causes the at least one processor to: plan, upon receiving a container warehousing task via the communication module 1, a target warehousing area and a target warehousing space corresponding to each container in the container warehousing task, and assign a warehouse hoisting apparatus to hoist a target container carried by a transportation vehicle to a corresponding target warehousing space; and/or assign, upon receiving a container distribution task via the communication module 1, a warehouse hoisting apparatus to load a target container in the container distribution task onto an assigned transportation vehicle.

The warehousing control system according to the embodiment of the present disclosure can achieve the control of the container warehousing process and the control of the container distribution process.

The communication module 1 may be a communication module for wired communication or a communication module for wireless communication. In some optional embodiments, the communication module 1 may be a transceiver based on multiple communication protocols.

In a container warehousing process, the warehousing server 2 assigning the warehouse hoisting apparatus to hoist the target container carried by the transportation vehicle to the corresponding target warehousing space may include: the warehousing server confirming, upon receiving a container unloading in-position notification message transmitted from the transportation vehicle via the communication module 1, an identity of a container on the transportation vehicle, and assigning the warehouse hoisting apparatus to hoist the container on the transportation vehicle to the corresponding target warehousing space when the identity is confirmed.

The warehousing server 2 assigning the warehouse hoisting apparatus to hoist the container on the transportation vehicle to the corresponding target warehousing space may include: the warehousing server 2 generating a container unloading hoisting task containing the target warehousing space for the container on the transportation vehicle, and transmitting the container unloading hoisting task to the warehouse hoisting apparatus via the communication module 1. Accordingly, the warehouse hoisting apparatus can lift and store the container on the transportation vehicle to the corresponding target warehousing space in accordance with the received container unloading hoisting task.

Optionally, the warehouse hoisting apparatus can transmit a container unloading completion notification message to the warehousing server 2 after storing the container on the transportation vehicle to the target warehousing space. Accordingly, the warehousing server 2 can be further configured to: mark, upon receiving a container unloading completion notification message from the warehouse hoisting apparatus via the communication module 1, the container as in a stored state in the container warehousing task; and transmit a container warehousing task completion notification message to a scheduling center via the communication module 1 when confirming that all containers in the container warehousing task have been marked as in the stored state.

In some optional embodiments, the warehousing server 2 can be configured to: confirm, upon receiving a container unloading in-position notification message, an identity of each target container on the transportation vehicle, and assign the warehouse hoisting apparatus to hoist the target container carried by the transportation vehicle to the corresponding warehousing space when the identity is confirmed.

In some optional embodiments, a tag containing the identification information of the container can be provided at the surface of the container. For example, the tag can be a Quick Response (QR) code or a barcode, and the warehousing management system 2 can confirm the identity of the container on the transportation vehicle by recognizing the QR code or barcode on the container.

In an optional embodiment, the warehousing server 2 can include an identity recognition device, which can be a camera, a code reader or any other device capable of recognizing a QR code or barcode (the present disclosure is not limited thereto). As an implementation of the embodiment of the present disclosure, the identity recognition device can be provided at or near a loading/unloading location of a container area and can obtain the identification information of the container by scanning the QR code or barcode on the container. The warehousing server 2 can compare the identification information of the container with the identification information of the container in the container warehousing task, and determine that the identity is confirmed when they match each other, or otherwise determine that the confirmation of the identity fails.

In an optional embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the container warehousing task, and determining that the identity is confirmed when they match each other, or otherwise determining that the confirmation of the identity fails.

In a container distribution process, the warehousing control system can control the warehouse hoisting apparatus to achieve automated loading. The warehousing server 2 assigning the warehouse hoisting apparatus to load the target container in the container distribution task onto the assigned transportation vehicle may include the warehousing server 2 confirming, upon receiving a container loading in-position notification message transmitted from the transportation vehicle via the communication module 1, an identity of a container at a target warehousing space in accordance with the container distribution task, and assigning the warehouse hoisting apparatus to load the container onto the transportation vehicle when the identity is confirmed.

The warehousing server 2 assigning the warehouse hoisting apparatus to load the container onto the transportation vehicle may include: the warehousing server 2 generating a container loading hoisting task containing the target warehousing space based on the container distribution task, and transmitting the container loading hoisting task to the warehouse hoisting apparatus. The warehouse hoisting apparatus can lift the container at the target warehousing space in the container loading hoisting task upon receiving the container loading hoisting task, and hoist the container onto the transportation vehicle upon receiving a transportation vehicle in-position notification message.

Optionally, the warehouse hoisting apparatus can transmit a container loading completion notification message to the warehousing server 2 when completing the container loading hoisting task. Accordingly, the warehousing server 2 can be further configured to: mark, upon receiving a container loading completion notification message for the container from the warehouse hoisting apparatus via the communication module 1, the container as in a distributed state in the container distribution task; and transmit a container distribution task completion notification message to a scheduling center via the communication module when confirming that all containers in the container distribution task have been marked as in the distributed state.

In an optional embodiment, the warehousing server 2 can recognize the tag on the container at the target warehousing space in the container distribution task using the identity recognition device to obtain the identification information of the container, compare the identification information with the identification information of the container in the container distribution task, and determine that the identity is confirmed when they match each other, or otherwise determine that the confirmation of the identity fails.

Figure 2:
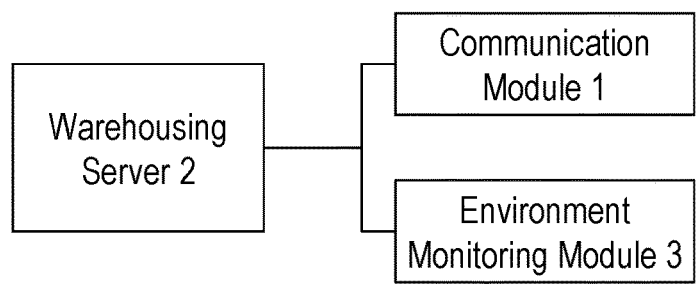
FIG. 2 is a second schematic diagram showing a structure of a warehousing control system according to an embodiment of the present disclosure.

In some optional embodiments, in order to monitor warehouse environment information of a warehouse center in real time for ensuring the security of the container storage, in an embodiment of the present disclosure, an environment monitoring module 3 can be provided in the warehousing control system shown in FIG. 1, as shown in FIG. 2.

The environment monitoring module 3 is configured to detect warehouse environment information, and transmit the warehouse environment information to the warehousing server 2.

The warehousing server 2 can be further configured to transmit the received warehouse environment information to the scheduling center via the communication module 1.

In some optional embodiments, the environment monitoring module 1 may include at least one of a temperature sensor, a humidity sensor, a smoke detection sensor, or an electromagnetic radiation sensor.

In some optional embodiments, the warehousing server 2 can determine whether the warehouse environment meets predetermined requirements based on the received warehouse environment information, and if so, perform no additional processing; or otherwise issue an alarm.

In some optional embodiments, the scheduling center can determine whether the warehouse environment meets predetermined requirements based on the received warehouse environment information, and if so, perform no additional processing; or otherwise issue an alarm.

Different sensors can be installed in different warehousing areas. For example, electromagnetic radiation sensors, smoke detection sensors, or temperature and humidity sensors can be installed in warehousing areas for flammable and explosive goods, such as chemicals and petroleum. Temperature sensors and humidity sensors can be installed in warehousing areas for perishable goods such as drugs and food, since the warehousing of these goods need to monitor the warehouse environment in real time, e.g., with respect to temperature and humidity, ventilation and moisture resistance. An alarm can be issued once it is detected that the warehouse environment is not suitable for warehousing the goods. The alarm can be issued by the warehousing server or by the scheduling center.

In order to have an overall and efficient plan for the container storage in the warehousing areas, in some optional embodiments, the warehousing server 2 can be further configured to: create a virtual 3D warehouse model based on an occupied area of each warehousing area and a container size, the 3D warehouse model showing warehousing space information and warehousing space state information of each warehousing area; and report the warehousing space information and the warehousing space state information of each warehousing area to the scheduling center and/or the warehousing server via the communication module 1.

In an embodiment of the present disclosure, the warehousing space information may include information such as a warehousing space number and a position of the warehousing space. The warehousing space state information may include the warehousing space being available, occupied, or operating. When no container is stored at the warehousing space, the warehousing space state of the warehousing space is available. When a container is stored at the warehousing space, the warehousing space state of the warehousing space is occupied. When a container at the warehousing space is in the process of being stored or distributed, the warehousing space state of the warehousing space is operating.

Figure 3:
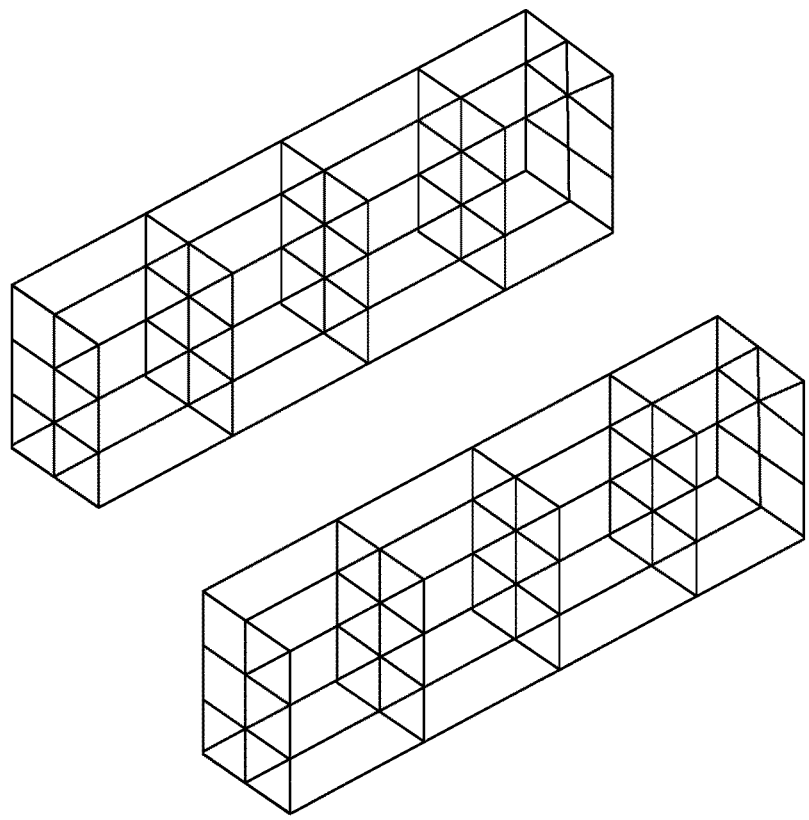
FIG. 3 is a first schematic diagram showing a structure of a virtual 3D warehouse model according to an embodiment of the present disclosure.
Figure 4:
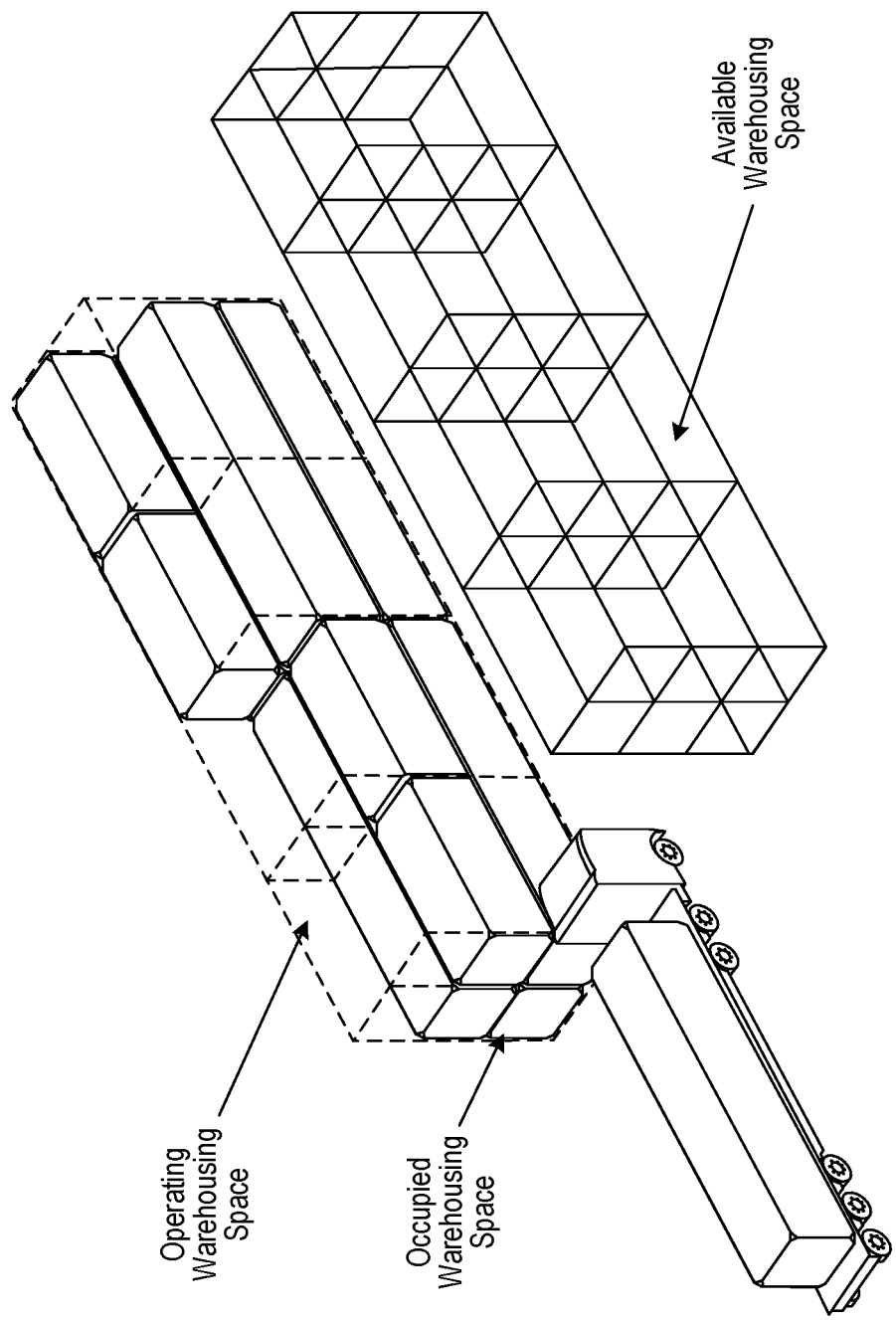
FIG. 4 is a second schematic diagram showing a structure of a virtual 3D warehouse model according to an embodiment of the present disclosure.

The warehousing server 2 creating the virtual 3D warehouse model based on the occupied area of each warehousing area and the container size may include: the warehousing server 2 determining a number of rows and a number of columns of warehousing spaces to be arranged in the warehousing area based on the occupied area of the warehousing area and the container size, and determining a height of each column based on the type of goods to be stored in the warehousing area. The virtual 3D warehouse model can be created based on the number of rows and the number of columns of the warehousing spaces in the warehousing area and the height of each column, as shown in FIG. 3. In the virtual 3D warehouse model, the warehousing spaces can be displayed in different forms depending on their respective warehousing space states. For example, different warehousing space states can be represented by different colors or different filling textures, e.g., available warehousing spaces may be represented as transparent, occupied warehousing spaces may be represented in green, or operating warehousing spaces may be represented in blue. This can be set flexibly by those skilled in the art depending on actual requirements shown in FIG. 4.

In some optional embodiments, the warehousing server 2 may use 3D modeling software to create the virtual 3D warehouse model.

In an embodiment of the present disclosure, the warehousing server 2 can updates the warehousing space states of the warehousing spaces in the virtual 3D warehouse model in real time based on the execution processes of the container warehousing task and the container distribution task. Therefore, the warehousing server 2 can be further configured to: change, after receiving the container warehousing task and planning the target warehousing space corresponding to each container in the container warehousing task, the warehousing space state of each target warehousing space to operating; change, when warehousing of each container has completed, the warehousing space state of the warehousing space occupied by the container to occupied; determine, upon receiving the container distribution task, a warehousing space occupied by the container to be distributed, and change the warehousing space state of the determined warehousing space to operating; and change, when distribution of the container has completed, the warehousing space state of the warehousing space occupied by the distributed container to available.

The virtual 3D warehousing model shows the container storage state for the current warehousing area, including warehousing spaces, operating warehousing spaces, and available warehousing spaces. When transmitting the container unloading hoisting task to the warehouse hoisting apparatus, the warehousing server 2 can change the state of the target warehousing space in the container unloading hoisting task to "operating"; when receiving the container unloading completion notification message from the warehouse hoisting apparatus, the warehousing server 2 can change the state of the corresponding warehousing space to "occupied"; when transmitting the container loading hoisting task to the warehouse hoisting apparatus, the warehousing server 2 can change the state of the target warehousing space in the container loading hoisting task to "operating"; and when receiving the container loading completion notification message from the warehouse hoisting apparatus, the warehousing server 2 can change the state of the corresponding warehousing space to "available".

In some optional embodiments, the warehousing control system can further manage and perform warehousing scheduling of the warehousing area and the containers stored therein.

Accordingly, the warehousing server 2 can be further configured to: manage and record a warehousing space, warehousing time, an origin and a next destination of each container warehoused in each warehousing area, and generate a warehousing report; and update, after receiving the container warehousing task and/or the container distribution task transmitted from the scheduling center, the warehousing report in real time based on a completion condition of the task.

When the warehousing server 2 receives the container warehousing task, it can update the warehousing report each time the warehouse hoisting apparatus stores a container, and record the warehousing space, the warehousing time, the origin and the next destination of the container in the warehousing report. The warehousing server 2 can update the warehouse report each time the warehouse hoisting apparatus distributes a container, to remove the recorded information related to the container from the warehousing report.

In some optional embodiments, the warehousing server 2 can be further configured to report warehousing condition information of each warehousing area to a cloud server via the communication module, the warehousing situation information including at least one of: container warehousing task information for each warehousing area, container distribution task information of each warehousing area, information on warehoused containers and information on goods in the containers, warehousing space information and warehousing space state information for each warehousing area, and warehouse environment information.

All the inbound and outbound information, goods information, warehousing space information (including the virtual 3D warehouse) and warehouse environment state information for the warehousing area will be uploaded to the cloud server in real time for backup and sharing, so as to ensure the safety and reliability of port goods information. Such big data information can be provided to the port for big data analysis to further optimize the management of the port.

In an embodiment of the present disclosure, the warehouse hoisting apparatus may be any apparatus having a hoisting function, such as a tire crane, a shore bridge, a reach stacker, a rail-mounted crane, an overhead crane, a crane, a forklift, or the like. The hoisting arm on the warehouse hoisting apparatus may be a hoister or a mechanical arm. The present disclosure is not limited to any specific structure of the hoisting arm.

The technical solutions of the present disclosure can be applied to various application scenarios, such as a coastal port area, a highway port area, a mining area, a cargo distribution center, a logistics center, a campus, or the like. The present disclosure is not limited to any specific application scenario.

According to some embodiments of the present disclosure, a computer device is also provided. The computer device includes the warehousing control system according to any of the above embodiments.

Unless stated otherwise specifically, terms such as processing, calculating, operating, determining, displaying and the like may refer to an action and/or procedure performed by one or more processing or computing systems or similar devices. The action and/or procedure can be represented as a data operation on a physical (e.g., electronic) quantity in a register or memory of a processing system or a conversion into other data similarly represented as a physical quantity in a memory or register of a processing system or any other similar information storage, transmission or display device. Information or signals can be represented using any of various different techniques and methods. For example, the data, instructions, commands, information, signals, bits, symbols and chips mentioned throughout the above description can be represented using voltages, currents, electromagnetic waves, magnetic fields or particles, optical fields or particles, or any combination thereof.

It should be noted that any particular order or hierarchy of the steps in the disclosed process is only an example of an exemplary method. It can be appreciated that, depending on design preferences, the particular order or hierarchy of the steps in the disclosed process can be re-arranged without departing from the scope of the present disclosure. The method claims as attached show elements of the respective steps in an exemplary order, but they are not limited to the particular order or hierarchy as described.

In the above detailed description, various features may be combined together in one single embodiment for simplicity. However, such disclosure should not be interpreted as reflecting an intent that the implementation of the claimed subject matter requires more features than those clearly defined in each claim. Rather, as reflected by the claims as attached, the present disclosure may be in a state having less than all features of the one single embodiment as disclosed. Therefore, the claims are hereby explicitly incorporated into the detailed description and each claim individually constitutes a separate preferred embodiment of the present disclosure.

It can be appreciated by those skilled in the art that various illustrative logic blocks, modules, circuits and algorithm steps described in connection with the embodiments of the present disclosure can be implemented as electronic hardware, computer software or any combination thereof. In order to clearly illustrate the interchangeability between the hardware and the software, the illustrative components, blocks, modules, circuits and steps have been described above generally with respect to their functions. Depending on specific applications and design constraints applied to the entire system, the functions can be implemented in either hardware or software. For each specific application, those skilled in the art can implement the described function flexibly. However, such implementation decision should not be interpreted as departing from the scope of the present disclosure.

The steps of the methods or algorithms described in connection with the embodiments of the present disclosure can be embodied directly as hardware, software modules executable by processors or any combination thereof. The software modules can be provided in a RAM, a flash memory, a ROM, an EPROM, an EEPROM, a register, a hard drive, a removable magnetic drive, a CD-ROM or any other form of storage medium known in the art. An exemplary storage medium is connected to a processor, such that the processor can read information from the storage medium or write information into the storage medium. Of course, the storage medium can alternatively be a component of the processor. The processor and the storage medium can be provided in an ASIC. The ASIC can be in a user terminal. Of course, the processor and the storage medium can be provided as separate components in a user terminal.

For software implementations, the technique described in the present disclosure can be implemented using modules (e.g., processes, functions or the like) performing the functions described in the present disclosure. These software codes can be stored in a memory unit and executed by a processor. The memory unit can be provided within the processor or externally to the processor. In the latter case, it can be communicatively coupled to the processor in various ways known in the art.

The above description includes examples of one or more embodiments. Of course, it would be impossible to describe all possible combinations of components or methods in order to describe the above embodiments. However, it can be appreciated by those skilled in the art that the embodiments can be further combined and arranged. Thus, the embodiments described herein are intended to cover all such changes, modifications and variants that fall within the scope of the claims as attached. Further, the term "including" as used in the description or claims has a coverage similar to that of the term "comprising" when used in the claims as a transition word. Moreover, any term "or" as used in the claims or description is to be interpreted as "or in a non-exclusive sense".

I claim:

1. A warehousing control system, comprising:
    a communication module configured to transmit and receive information; and
    a warehousing server comprising at least one processor and at least one memory, the at least one memory storing at least one machine executable instruction which, when executed by the at least one processor, causes the at least one processor to:
        plan, upon receiving a container warehousing task via the communication module, a target warehousing space corresponding to each container in the container warehousing task;
        detect a container identified in the container warehousing task is in a position to be transported into a corresponding target warehousing space; and
        send a control signal, via the communication module, to a warehouse hoisting apparatus to automatically cause the warehousing hoisting apparatus to transport the container to the corresponding target warehousing space in response to detecting the container is in the position to be transported.

2. The warehousing control system of claim 1, further comprising:
    an environment monitoring module configured to detect warehouse environment information and transmit the warehouse environment information to the warehousing server;
    wherein the warehousing server is configured to output an alarm if the detected warehouse environment information does not meet storage requirements for the containers in the container warehousing task.

3. The warehousing control system of claim 2, wherein the environment monitoring module comprises at least one of a temperature sensor, a humidity sensor, a smoke detection sensor, or an electromagnetic radiation sensor.

4. The warehousing control system of claim 1, wherein the warehousing server is further configured to:
    create a virtual 3D warehouse model based on an occupied area of each warehousing area and a container size, the 3D warehouse model showing warehousing space information and warehousing space state information of each warehousing area; and
    report the warehousing space information and the warehousing space state information of each warehousing area to a scheduling center or the warehousing server via the communication module.

5. The warehousing control system of claim 4, wherein the warehousing server is further configured to:
    change, after receiving the container warehousing task and planning the target warehousing space corresponding to each container in the container warehousing task, a warehousing space state of each target warehousing space to an operating state;
    change, when each container in the container warehousing task has been stored at the corresponding target warehousing space, the warehousing space state of the warehousing space occupied by the container to an occupied state;
    change, upon receiving a container distribution task, the warehousing space state of the warehousing space occupied by the container to an operating state; or
    change, when distribution of the container has completed, the warehousing space state of the warehousing space occupied by the container to an available state.

6. The warehousing control system of claim 1, wherein the warehousing server being configured to plan the target warehousing space corresponding to each container in the container warehousing task comprises the warehousing server being configured to:
    determine, for each container in the container warehousing task, a target warehousing area corresponding to the container based on a type of goods carried by the container, and
    determine a target warehousing space corresponding to the container from available warehousing spaces in the target warehousing area corresponding to the container.

7. The warehousing control system of claim 1, wherein the warehousing server is further configured to:
    record a warehousing space, warehousing time, an origin and a next destination of each container stored in each warehousing area, to generate a warehousing report; and update, after receiving the container warehousing task or a container distribution task from a scheduling center, the warehousing report in real time based on a completion condition of the task.

8. The warehousing control system of claim 1, further comprising:
an image recognition device;
wherein detecting the container identified in the container warehousing task is in the position to be transported comprises causing the image recognition device to read a machine-readable code on the container.

9. The warehousing control system of claim 1, wherein detecting the container identified in the container warehousing task is in the position to be transported comprises retrieving an identifier from an electronic tag on the container.

10. A computing device, comprising a processor configured to perform a method comprising:
planning, upon receiving a container warehousing task, a target warehousing space corresponding to each container in the container warehousing task,
detecting a container identified in the container warehousing task is in a position to be transported into a corresponding target warehousing space; and
sending a control signal to a warehouse hoisting apparatus to automatically cause the warehousing hoisting apparatus to transport the container to the corresponding target warehousing space in response to detecting the container is in the position to be transported.

11. The computing device of claim 10, wherein the processor is configured to perform the method that further comprises:
detecting, using a device, a warehouse environment information; and
transmitting the warehouse environment information to the warehousing server;
wherein the warehousing server is configured to output an alarm if the detected warehouse environment information does not meet storage requirements for the containers in the container warehousing task.

12. The computing device of claim 11, wherein the device comprises at least one of a temperature sensor, a humidity sensor, a smoke detection sensor, or an electromagnetic radiation sensor.

13. The computing device of claim 10, wherein the processor is configured to perform the method that further comprises:
creating a virtual 3D warehouse model based on an occupied area of each of a plurality of warehousing areas and a container size, the 3D warehouse model showing warehousing space information and warehousing space state information of each warehousing area; and
reporting the warehousing space information and the warehousing space state information of each warehousing area to a scheduling center or the warehousing server.

14. The computing device of claim 10, wherein the processor is configured to perform the method that further comprises:
sending a control signal, upon receiving a container distribution task identifying a second target container, to the warehouse hoisting apparatus to automatically cause the warehousing hoisting apparatus to load the second target container in the container distribution task onto an assigned transportation vehicle.

15. The computing device of claim 14, wherein the processor being configured to send the control signal to the warehouse hoisting apparatus to automatically cause the warehouse hoisting apparatus to load the second target container onto the assigned transportation vehicle comprises the processor being configured to:
detect an identity of the second target container at a target warehousing space in accordance with the container distribution task; and
send the control signal to the warehouse hoisting apparatus in response to the identity being detected.

16. The computing device of claim 10, wherein detecting the container identified in the container warehousing task is in the position to be transported comprises causing an image recognition device to read a machine-readable code on the container.

17. The computing device of claim 10, wherein detecting the container identified in the container warehousing task is in the position to be transported comprises retrieving an identifier from an electronic tag on the container.

18. A warehousing control system, comprising:
a communication module configured to transmit and receive information; and
a warehousing server comprising at least one processor and at least one memory, the at least one memory storing at least one machine executable instruction which, when executed by the at least one processor, causes the at least one processor to:
assign, upon receiving a container distribution task via the communication module, a warehouse hoisting apparatus to load a target container in the container distribution task onto an assigned transportation vehicle,
wherein the warehousing server being configured to assign the warehouse hoisting apparatus to load the target container in the container distribution task onto the assigned transportation vehicle comprises the warehousing server being configured to:
detect the assigned transportation vehicle is in a position to transport the target container, and
send a control signal, via the communication module, to the warehouse hoisting apparatus to automatically cause the warehouse hoisting apparatus to load the target container onto the assigned transportation vehicle in response to detecting the assigned transportation vehicle is in the position to transport the target container.

19. The warehousing control system of claim 18, wherein the warehousing server is further configured to:
mark, upon receiving a container loading completion notification from the warehouse hoisting apparatus via the communication module, a distributed state for the target container in the container distribution task, wherein the container loading completion notification indicates that the warehouse hoisting apparatus has completed loading the target container onto the assigned transportation vehicle; and
transmit a container distribution task completion notification to a scheduling center via the communication module when confirming that the distributed state has been marked for all containers in the container distribution task.

20. The warehousing control system of claim 18, wherein the warehousing server is further configured to:
change, upon receiving the container distribution task, the target warehousing space to an operating state; and after the target container has been loaded onto the assigned transportation vehicle, change the target warehousing space to an available state.

\* \* \* \* \*